US006945522B2

(12) United States Patent
Eshelman

(10) Patent No.: US 6,945,522 B2
(45) Date of Patent: Sep. 20, 2005

(54) MULTI-RATE TORSION BAR INDEPENDENT SUSPENSION SPRING

(75) Inventor: Edward Jay Eshelman, Rochester Hills, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 396 days.

(21) Appl. No.: 10/137,510

(22) Filed: Apr. 30, 2002

(65) Prior Publication Data

US 2003/0201591 A1 Oct. 30, 2003

(51) Int. Cl.[7] .................................................. F16F 1/14
(52) U.S. Cl. ....................................... 267/273; 277/154
(58) Field of Search ................................ 267/273, 277, 267/154

(56) References Cited

U.S. PATENT DOCUMENTS 4,635,958 A * 1/1987 Yonemoto ................... 267/273
4,884,790 A 12/1989 Castrilli
5,186,216 A * 2/1993 Bollier ....................... 267/276
5,288,101 A * 2/1994 Minnett ...................... 267/277
5,354,041 A 10/1994 Edwards
5,687,960 A * 11/1997 Moon ......................... 267/273
6,425,594 B1 * 7/2002 Fader et al. ................ 267/277

* cited by examiner

*Primary Examiner*—Matthew C. Graham
(74) *Attorney, Agent, or Firm*—Carlson, Gaskey & Olds

(57) ABSTRACT

A torsion bar suspension assembly is provided that includes a control arm supported by a frame. The torsion bar extends along a longitudinal axis having a first end portion connected to the control arm and a second end portion engaging the frame. A contact arm is connected to the torsion bar and is arranged between the first and second end portions. The contact arm is spaced from the frame in a first position and engages the frame in a second position. A first spring rate is provided when the contact arm is spaced from the frame between the first and second positions. Once the contact arm engages the frame between second and third positions, a second spring rate is provided that is different from the first spring rate.

15 Claims, 1 Drawing Sheet

MULTI-RATE TORSION BAR INDEPENDENT SUSPENSION SPRING

BACKGROUND OF THE INVENTION

This invention relates to torsion bars for independent suspensions, and more particularly, the invention relates to variable rate torsion bars.

Vehicle suspension assemblies may utilize torsion bars to increase the stiffness of the suspension and improve handling characteristics. For example, independent suspension that utilize coil springs frequently use torsion bars to provide supplemental stiffness to the coil spring at a different spring rate. Specifically, the torsion bar may be connected between a control arm and the frame. As the control arm moves vertically in response to inputs from the roadway, the torsion bar will rotationally deflect. Independent suspensions utilizing torsion bars can provide a significant packing advantage. However, a drawback of torsion bars is that they typically permit only a single spring rate. Multiple spring rates are desireable to provide refined handling characteristics. That is, it is desireable to provide different stiffness through the motion of the control arm. Therefore, what is needed is a multi-rate torsion bar that provides the packaging advantages of conventional single rate torsion bars while providing the suspension design with flexibility and optimization of handling characteristics.

SUMMARY OF THE INVENTION AND ADVANTAGES

The present invention provides a torsion bar suspension assembly including a control arm supported by a frame. The torsion bar extends along a longitudinal axis having a first end portion connected to the control arm and a second end portion engaging the frame. A contact arm is connected to the torsion bar and is arranged between the first and second end portions. The contact arm is spaced from the frame in a first position and engages the frame in a second position. When the contact arm is spaced from the frame between the first and second positions, a first spring rate is provided. Once the contact arm engages the frame between second and third positions, a second spring rate is provided that is different from the first spring rate. In this manner, the multi-rate torsion spring provides the packaging advantages of conventional torsion bars while providing increased design flexibility and optimize handling characteristics.

Accordingly, the above invention provides a multi-rate torsion bar that provides the packaging advantages of conventional single rate torsion bars while providing the suspension design with flexibility and optimization of handling characteristics.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
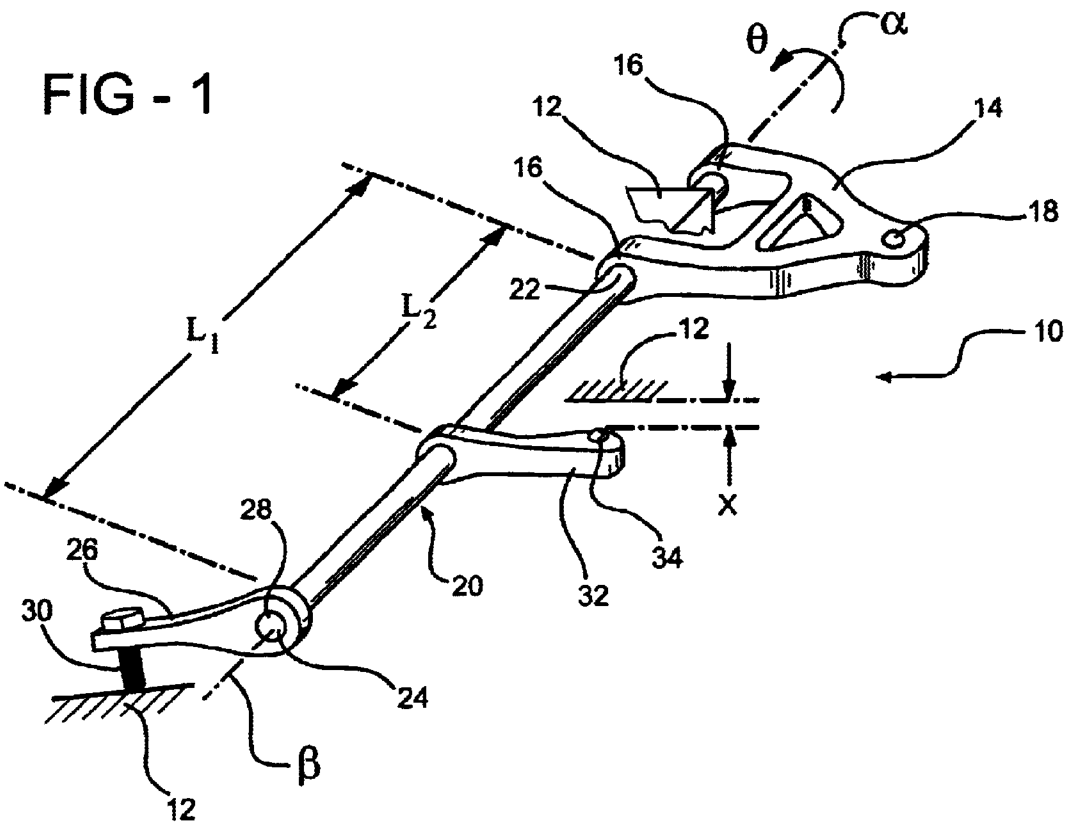
FIG. 1 is a perspective view of the present invention torsion bar suspension assembly.

A torsion bar suspension assembly 10 is shown in FIG. 1. The assembly 10 includes a frame 12 rotationally supporting a control arm 14 at pivotal connections 16. The control arm rotates relative to the frame 12 about a rotational axis α. A wheel end assembly (not shown) is supported on the control arm 14 at a support connection 18. A coil spring (not shown) may be arranged between the control arm 14 and frame 12. The control arm 14 rotates an angle θ about the rotational axis α in response to inputs from the roadway.

A torsion bar 20 includes first 22 and second 24 end portions. The first end portion 22 is supported by the control arm 14. The torsion bar 20 has a longitudinal access β that is preferably coaxial with the rotational axis α. In the prior art, the second end portion 24 is directly supported by the frame. According to one aspect of the present invention, an adjustment arm 26 may be secured to a hexagonal end 28 of the second end portion 24. The adjustment arm 26 extends transversely from the torsion bar 20 and includes an adjustment screw 30 that engages a portion of the frame 12. It is to be understood that the frame 12 includes any structural frame members or associated brackets. The adjustment screw 30 may be manipulated to adjust the initial angle θ at which the torsion bar 20 rotationally deflects in response to an input from the control arm 14.

Figure 2:
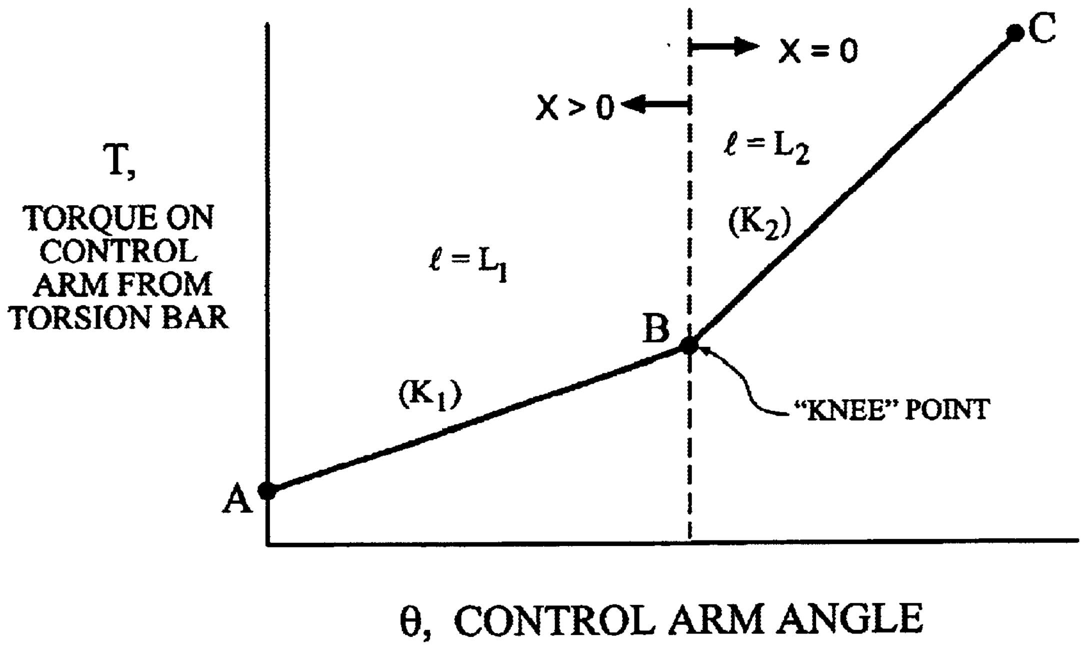
FIG. 2 is a graph of the spring rate for the torsion bar depicted in FIG. 1.

Typically, the length, cross-sectional area, and material of the torsion bar defines a single spring rate. The present invention utilizes a contact arm 32 arranged between the first 22 and second 24 end portions to divide the torsion bar 20 into segments to provide multiple spring rates. The contact arm 32 extends transversely from the torsion bar 20 to an end that is adjacent to a portion of the frame 12. The end of the contact arm 32 may include a rubber stopper 34 to minimize noise during operation of the suspension 10. The assembly 10 includes a first position in which the contact arm 32 is spaced from the frame 12 to provide a gap X. The first position is graphically depicted at point A in FIG. 2 and shown in FIG. 1. The suspension assembly 10 moves to a second position, graphically depicted at point B in FIG. 2, in which the contact arm 32 initially engages the frame 12. The suspension assembly 10 may continue to move to a third position, graphically depicted at point C in FIG. 2.

The contact arm 32 effectively provides first and second spring rates. As may be appreciated by the equations below, the first spring rate is defined by the length of the torsion bar $L_1$. The second spring rate is defined by the second length $L_2$.

$$k = \frac{T}{\theta} = \frac{GJ}{l} = \frac{G\pi d^4}{32l}, \text{ where}$$

k=torsional stiffness

T=torque

θ=angular displacement (radians)

G=shear modulus

J=polar second moment of area l=length of bar d=diameter of bar $$k_1 = \frac{G\pi d^4}{32L_1} \quad k_2 = \frac{G\pi d^4}{32L_2}$$

Although the torsion bar 20 is depicted as having a constant cross-sectional cylindrical area, it is to be understood that the torsion bar 20 may have different cross-sectional areas. In addition to the cross-sectional area of the torsion bar 20, the length of each segment and the material properties of each segment affect the torsional stiffness, as may be appreciated from the equations above.

In operation, between the first and second positions in which there is a gap between the contact arm 32 and the frame 12, the torsion bar rotationally deflects across the entire length $L_1$. Between the second and third positions in which the contact bar 32 has engaged the frame 12, the torsion bar 20 will only continue to rotationally deflect across the length $L_2$ which provide a stiffer spring rate. In this manner, two spring rates are provided by the torsion bar. It is to be understood that any number of contact arms may be used to provide more than two spring rates.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A torsion bar suspension assembly comprising:

a frame;

a control arm connected to said frame at a rotational axis about which said control arm pivots relative to said frame respectively between first, second, and third positions;

a torsion bar extending along a longitudinal axis having a first end portion connected to said control arm and a second end portion connected to said frame, said torsion bar rotating about said longitudinal axis in response to said control arm pivoting about said rotation axis relative to said frame;

a contact arm connected to said torsion bar interposed between said first and second end portions, said contact arm extending from said torsion bar transverse to said longitudinal axis to a contact point with said contact point spaced from said frame in said first position defining a gap, said contact point engaging said frame in said second position wherein said second end portion includes an adjustment arm engaging said frame with said adjustment arm movable between a plurality of desired positions with said contact arm arranged between said adjustment arm and said control arm.

2. The assembly according to claim 1, wherein said rotational and longitudinal axes are coaxial.

3. The assembly according to claim 1, wherein said adjustment arm includes an adjustment member coacting with said frame and moving said adjustment arm between said plurality of desired positions.

4. The assembly according to claim 3, wherein said adjustment member is an adjustment screw.

5. The assembly according to claim 1, wherein said control arm includes a rotational axis about which said control arm pivots relative to said frame respectively between first, second, and third positions.

6. The assembly according to claim 5, wherein said torsion bar rotates about said longitudinal axis in response to said control arm pivoting about said rotation axis relative to said frame.

7. The assembly according to claim 5, wherein said contact arm extends transversely from said torsion bar.

8. The assembly according to claim 5, wherein said contact arm engages said frame in said third position.

9. The assembly according to claim 8, wherein said torsion bar includes a first spring rate between said first and second position and a second spring rate between said second and third positions.

10. A torsion bar suspension assembly comprising:

a frame;

a control arm connected to said frame at a rotational axis about which said control arm pivots relative to said frame respectively between first, second, and third positions;

a torsion bar extending along a longitudinal axis having a first end portion connected to said control arm and a second end portion connected to said frame, said torsion bar rotating about said longitudinal axis in response to said control arm pivoting about said rotation axis relative to said frame;

a contact arm connected to said torsion bar interposed between said first and second end portions, said contact arm extending from said torsion bar transverse to said longitudinal axis to a contact point with said contact point spaced from said frame in said first position defining a gap, said contact point engaging said frame in said second position;

wherein said torsion bar includes a first length between said first and second end portion and a second length between said first end portion and said contact arm, said lengths at least partially defining said respective spring rates; and wherein said torsion bar includes a generally uniform cross-section along said lengths.

11. A method of providing a variable spring rate torsion bar comprising the steps of:

a) dividing the torsion bar into at least two segments with a contact arm;

b) supporting a second end portion of the torsion bar on a frame;

c) spacing the contact arm from the frame in a first suspension position;

d) adjusting the second end portion relative to the frame to change a gap between the contact arm and the frame; and e) engaging the frame with the contact arm in a second suspension position.

12. The method according to claim 11, including the step of supporting a control arm at a first end portion of the torsion bar.

13. The method according to claim 11, wherein step d) includes manipulating an adjustment screw supported by the adjustment arm.

14. The method according to claim 11, wherein step b) includes rotationally deflecting the torsion bar at a first spring rate.

15. The method according to claim 14, wherein step c) includes rotationally deflecting the torsion bar at a second spring rate.

* * * * *